(No Model.)
J. M. LINDSEY.
TRANSPLANTING IMPLEMENT.
No. 275,505. Patented Apr. 10, 1883.
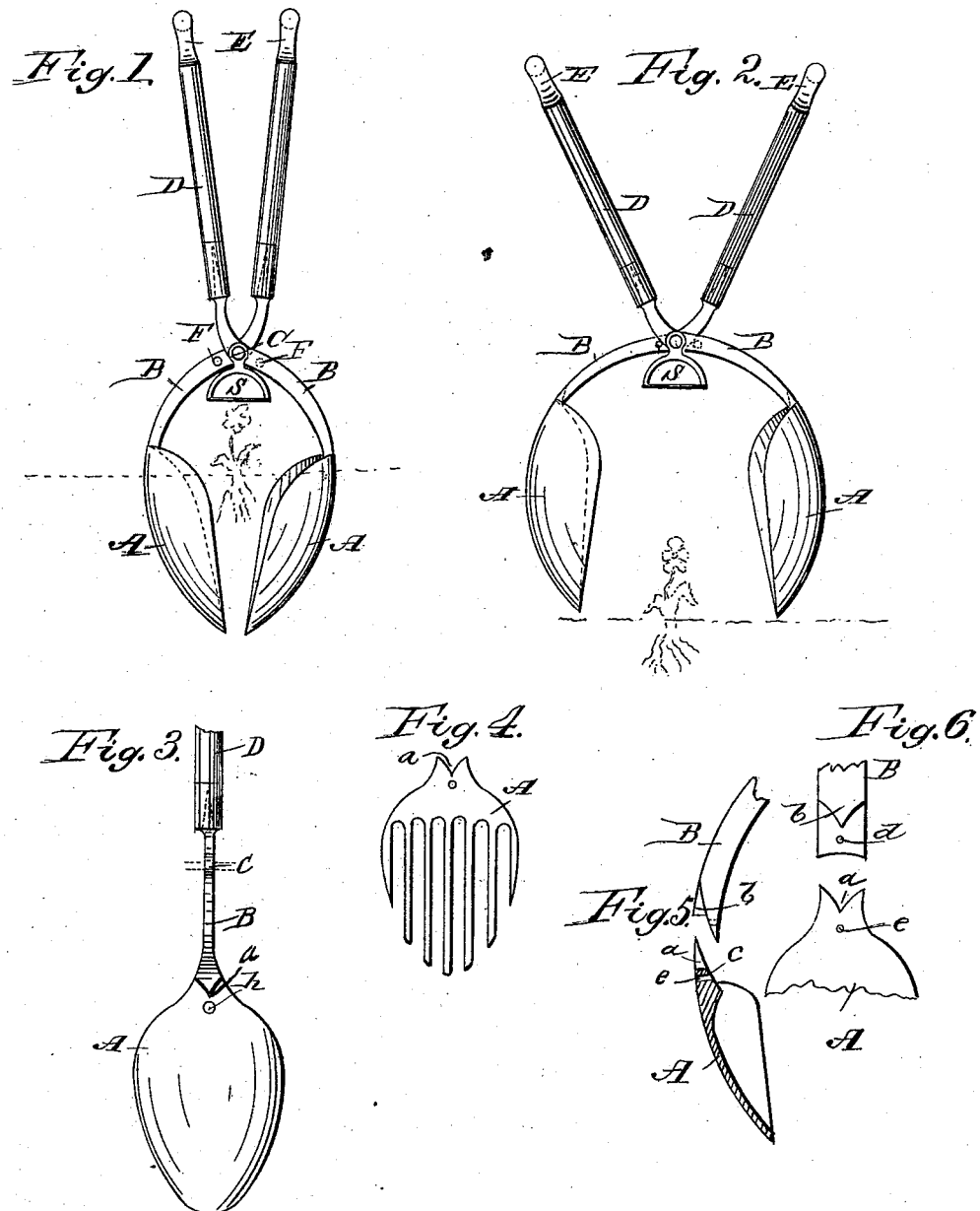
WITNESSES:
INVENTOR:
J. M. Lindsey
BY Munn & Co.
ATTORNEYS.

UNITED STATES PATENT OFFICE.

JOHN M. LINDSEY, OF CRYSTAL SPRINGS, GEORGIA.

TRANSPLANTING IMPLEMENT.

SPECIFICATION forming part of Letters Patent No. 275,505, dated April 10, 1883.

Application filed December 1, 1882. (No model.)

*To all whom it may concern:*

Be it known that I, JOHN M. LINDSEY, of Crystal Springs, Floyd county, Georgia, have invented a new and Improved Transplanting-Instrument, of which the following is a full, clear, and exact description.

The object of my invention is to provide a new and improved implement for transplanting flowers, young plants, &c., in such a manner that they are not injured by being transplanted, and do not have their roots loosened from the earth in which they are embedded.

The invention consists in a transplanting implement formed of two spoons or scoops provided with arms which are pivoted to each other, and to which arms handles are attached, whereby the scoops can be separated and forced into the ground and gradually closed, whereby the cone of earth containing the roots of the plant will be held between the scoops and can be withdrawn from the ground.

The invention also consists in parts and details of construction, as will be fully described and set forth hereinafter.

Reference is to be had to the accompanying drawings, forming part of this specification, in which similar letters of reference indicate corresponding parts in all the figures.

Figure 1 is a longitudinal elevation of my improved implement, showing it closed. Fig. 2 is a like elevation, showing it opened, and Fig. 3 is a side elevation of the lower part of the same. Fig. 4 is an elevation of a modification of the scoop. Fig. 5 is an enlarged sectional elevation of the upper part of the scoop and the lower part of the handle, and Fig. 6 is a front elevation of the same.

Two spoons or scoops, A, which have their lower ends contracted and the edges sharpened, are each provided with a curved arm, B, which arms are crossed and are pivoted by means of a pivot, C. To the upper ends of the arms B rods D are attached, which are provided at the upper ends with handles E, of any construction, the usual shovel-handle being preferred. Each arm B is provided with a check-stud, F, against which the opposite arm B strikes when the scoops A have been separated to the greatest possible distance, as shown in Fig. 2. The scoops may be constructed with a series of prongs, instead of being made solid, as shown in Fig. 4. The scoops can be attached to the arms B in various different ways; but the manner herewith shown is preferred. The scoop is provided in its upper end with a V-shaped recess, *a*, and the curved arm B is provided in its outer edge and at the lower end with a V-shaped projection, *b*, which fits into the recess *a*, the front part of the lower end of the arm resting against the upper beveled edge, *c*, of the scoop. A rivet, *h*, is then passed through the apertures *d* in the arm and *e* in the scoop.

To use the implement the handles and scoops are separated, and the scoops are then pressed into the ground, and at the same time the handles are moved toward each other, whereby a cone of earth surrounding the plant, shrub, or flower will be inclosed between the scoops, and if the implement is then drawn out of the ground the earth surrounding the roots of the plant will be raised with the plant. The earth will not be loosened from the roots of the plant, and the plant need not be removed from its mother earth. Plants, flowers, and shrubs can thus be transplanted very easily and rapidly without any danger.

The implement can be made of different sizes, according to the size of the plants or shrubs to be transplanted.

A stirrup, S, is suspended from the pivot C, which stirrup is to be used to facilitate forcing the scoops into the ground.

Having thus described my invention, I claim as new and desire to secure by Letters Patent—

1. The combination, with the pivoted curved arms B, carrying scoops A, and provided with handles D E, of the stirrup S, hinged to the curved arms by their pivotal pin, substantially as described.

2. The combination, with the pivoted curved arms B, carrying the spoon-shaped scoops A, and provided with the handles D E, and stoppins F, of the hinged stirrup S, substantially as described.

JOHN MARION LINDSEY.

Witnesses:
J. B. HINE,
J. C. MCDONALD.